(12) United States Patent
Whitby-Strevens

(10) Patent No.: US 7,417,973 B1
(45) Date of Patent: Aug. 26, 2008

(54) METHOD, APPARATUS AND COMPUTER PROGRAM PRODUCT FOR ENSURING NODE PARTICIPATION IN A NETWORK BUS

(75) Inventor: Colin Whitby-Strevens, Ben Lomond, CA (US)

(73) Assignee: Apple Inc., Cupertino, CA (US)

( * ) Notice: Subject to any disclaimer, the term of this patent is extended or adjusted under 35 U.S.C. 154(b) by 1015 days.

(21) Appl. No.: 10/335,972

(22) Filed: Dec. 31, 2002

(51) Int. Cl.
*H04Q 7/00* (2006.01)

(52) U.S. Cl. .................. 370/332; 370/402; 370/328

(58) Field of Classification Search .............. 370/256, 370/216, 257, 389, 252; 709/240, 220, 223, 709/227; 710/100, 113, 20, 104, 240
See application file for complete search history.

(56) References Cited

U.S. PATENT DOCUMENTS

| | | | | |
|---|---|---|---|---|
| 4,156,798 A | 5/1979 | Doelz | | 179/15 AL |
| 4,194,113 A | 3/1980 | Fulks et al. | | 371/20 |
| 5,014,262 A | 5/1991 | Harshavardhar | | 370/16 |
| 5,274,631 A | 12/1993 | Bhardwaj | | 370/60 |
| 5,343,461 A | 8/1994 | Barton et al. | | 370/13 |
| 5,394,556 A | * 2/1995 | Oprescu | | 709/220 |
| 5,452,330 A | 9/1995 | Goldstein | | 375/257 |
| 5,490,253 A | 2/1996 | Laha et al. | | 395/304 |
| 5,495,481 A | 2/1996 | Duckwall | | 370/85.2 |
| 5,539,390 A | 7/1996 | Nagano et al. | | 340/825.07 |
| 5,541,670 A | 7/1996 | Hanai | | 348/705 |
| 5,568,641 A | 10/1996 | Nelson et al. | | 395/700 |
| 5,583,922 A | 12/1996 | Davis et al. | | 379/96 |
| 5,621,659 A | 4/1997 | Matsumoto et al. | | 364/514 R |
| 5,630,173 A | 5/1997 | Oprescu | | 395/860 |
| 5,640,595 A | 6/1997 | Baugher et al. | | 395/830 |
| 5,684,715 A | 11/1997 | Palmer | | 365/514 C |
| 5,687,319 A | * 11/1997 | Cook et al. | | 370/256 |
| 5,701,476 A | 12/1997 | Fenger | | 395/652 |
| 5,701,492 A | 12/1997 | Wadsworth et al. | | 395/712 |
| 5,712,834 A | 1/1998 | Nagano et al. | | 369/19 |

(Continued)

OTHER PUBLICATIONS

Application of parametric model checking—the Root Contention protocol Bandini, G.; Spelberg, R.L.; de Rooij, R.C.H.; Toetenel, W.J.; System Sciences, 2001. Proceedings of the 34th Annual Hawaii International Conference on Jan. 3-6, 2001 pp. 10 pp.*

(Continued)

*Primary Examiner*—Thong H Vu
(74) *Attorney, Agent, or Firm*—Gazdzinski & Associates

(57) ABSTRACT

A method for configuring a computer network so that no non-root node can allocate itself a Physical_ID reserved for a root node. For each node that executes the self_ID process, a check is made of the available Physical_ID value as well as the designation of the node as a root or non-root node. If the value available is less than a value reserved for a root node, the value is assigned to the node. If the value not less than the value reserved for root node, a check is made to see if the node is a root node. A root node is assigned the value reserved for root. Non-root nodes are assigned a value that is greater than the value reserved for root node. After the value is assigned, the value-node assignment is broadcast over the network and the available pool of values is updated.

29 Claims, 5 Drawing Sheets

U.S. PATENT DOCUMENTS

| | | | | |
|---|---|---|---|---|
| 5,719,862 | A | 2/1998 | Lee et al. | 370/355 |
| 5,784,648 | A | 7/1998 | Duckwall | 395/860 |
| 5,802,048 | A | 9/1998 | Duckwall | 370/389 |
| 5,802,057 | A | 9/1998 | Duckwall et al. | 370/408 |
| 5,805,073 | A | 9/1998 | Nagano et al. | 340/825.07 |
| 5,809,331 | A | 9/1998 | Staats et al. | 395/830 |
| 5,832,298 | A | 11/1998 | Sanchez et al. | 395/828 |
| 5,835,761 | A | 11/1998 | Ishii et al. | 395/653 |
| 5,867,730 | A | 2/1999 | Leyda | 395/830 |
| 5,875,301 | A | 2/1999 | Duckwall et al. | 395/200.51 |
| 5,938,764 | A | 8/1999 | Klein | 713/1 |
| 5,968,152 | A | 10/1999 | Staats | 710/104 |
| 5,970,052 | A | 10/1999 | Lo et al. | 370/241 |
| 5,987,605 | A | 11/1999 | Hill et al. | 713/2 |
| 6,032,202 | A | 2/2000 | Lea et al. | 710/8 |
| 6,038,625 | A | 3/2000 | Ogino et al. | 710/104 |
| 6,070,187 | A | 5/2000 | Subramaniam et al. | 709/220 |
| 6,073,206 | A | 6/2000 | Piwonka et al. | 711/102 |
| 6,122,248 | A | 9/2000 | Murakoshi et al. | 370/216 |
| 6,131,129 | A | 10/2000 | Ludtke et al. | 710/5 |
| 6,131,134 | A | 10/2000 | Huang et al. | 710/103 |
| 6,133,938 | A | 10/2000 | James | 348/8 |
| 6,138,196 | A | 10/2000 | Takayama et al. | 710/105 |
| 6,141,702 | A | 10/2000 | Ludtke et al. | 710/5 |
| 6,141,767 | A | 10/2000 | Hu et al. | 714/1 |
| 6,157,972 | A * | 12/2000 | Newman et al. | 710/100 |
| 6,160,796 | A | 12/2000 | Zou | 370/257 |
| 6,167,532 | A | 12/2000 | Wiseccup | 713/300 |
| 6,173,327 | B1 | 1/2001 | De Borst et al. | 709/231 |
| 6,192,189 | B1 | 2/2001 | Fujinami et al. | 386/96 |
| 6,202,210 | B1 | 3/2001 | Ludtke | 725/20 |
| 6,233,615 | B1 | 5/2001 | Van Loo | 709/224 |
| 6,233,624 | B1 | 5/2001 | Hyder et al. | 709/327 |
| 6,247,083 | B1 | 6/2001 | Hake et al. | 710/107 |
| 6,253,114 | B1 | 6/2001 | Takihara | 700/83 |
| 6,253,255 | B1 | 6/2001 | Hyder et al. | 709/321 |
| 6,260,063 | B1 | 7/2001 | Ludtke et al. | 709/224 |
| 6,266,334 | B1 | 7/2001 | Duckwall | 370/397 |
| 6,266,344 | B1 | 7/2001 | Fujimori et al. | 370/468 |
| 6,266,701 | B1 | 7/2001 | Sridhar et al. | 709/232 |
| 6,282,597 | B1 | 8/2001 | Kawamura | 710/105 |
| 6,295,479 | B1 | 9/2001 | Shima et al. | 700/83 |
| 6,308,222 | B1 | 10/2001 | Krueger et al. | 709/247 |
| 6,311,228 | B1 | 10/2001 | Ray | 709/301 |
| 6,345,315 | B1 | 2/2002 | Mishra | 709/329 |
| 6,353,868 | B1 | 3/2002 | Takayama et al. | 710/129 |
| 6,363,085 | B1 | 3/2002 | Samuels | 370/502 |
| 6,366,964 | B1 * | 4/2002 | Shima et al. | 710/8 |
| 6,385,679 | B1 | 5/2002 | Duckwall et al. | 710/119 |
| 6,425,019 | B1 * | 7/2002 | Tateyama et al. | 710/11 |
| 6,453,376 | B1 * | 9/2002 | Fairman et al. | 710/240 |
| 6,473,816 | B1 * | 10/2002 | Yoshida et al. | 710/113 |
| 6,512,767 | B1 * | 1/2003 | Takeda et al. | 370/389 |
| 6,513,064 | B1 * | 1/2003 | Horiguchi et al. | 709/223 |
| 6,553,013 | B1 * | 4/2003 | Jones et al. | 370/328 |
| 6,580,827 | B2 * | 6/2003 | Ueda | 382/232 |
| 6,628,607 | B1 * | 9/2003 | Hauck et al. | 370/216 |
| 6,633,577 | B1 * | 10/2003 | Nyu | 370/416 |
| 6,658,474 | B2 * | 12/2003 | Kang | 709/227 |
| 6,691,096 | B1 * | 2/2004 | Staats | 707/1 |
| 6,754,184 | B2 * | 6/2004 | Miyano et al. | 370/257 |
| 6,799,208 | B1 * | 9/2004 | Sankaranarayan et al. | 709/223 |
| 6,813,651 | B1 * | 11/2004 | Smith et al. | 710/20 |
| 6,910,086 | B1 * | 6/2005 | Inoue et al. | 710/110 |
| 6,950,408 | B1 * | 9/2005 | Domon et al. | 370/257 |
| 6,963,938 | B2 * | 11/2005 | Suzuki et al. | 710/104 |
| 7,187,655 | B1 * | 3/2007 | Sato et al. | 370/252 |
| 7,194,755 | B1 * | 3/2007 | Nakata et al. | 725/78 |
| 2001/0028656 | A1 * | 10/2001 | Fukunaga | 370/402 |
| 2003/0001883 | A1 * | 1/2003 | Wang | 345/736 |
| 2003/0135495 | A1 * | 7/2003 | Vagnozzi | 707/3 |
| 2004/0073912 | A1 * | 4/2004 | Meza | 719/321 |
| 2004/0251887 | A1 * | 12/2004 | Sparrell et al. | 323/312 |
| 2006/0168337 | A1 * | 7/2006 | Stahl et al. | 709/240 |

OTHER PUBLICATIONS

Verification of a Leader Election Protocol Formal. .—Devillers.. (1997) www.cs.kun.nl/~marcod/pub/CSI-R9728.ps.gz.*

The tree identify protocol of IEEE 1394 in μCRL—Shankland, van der Zwaag (1998) www.cwi.nl/ftp/CWIreports/SEN/SEN-R9831.ps.Z.*

"Information Technology-Microprocessor Systems-Control and Status Registers (CSR) Architecture for Microcomputer Buses", ANSI/IEEE Standard 1212, The Institute of Electrical and Electronics Engineers, Inc. pp. I-122, 1994 Edition.

"IEEE Standard for a High Performance Serial Bus", IEEE Standard 1394-1995, Institute of Electrical and Electronics Engineers, Inc., pp. 1-384, approved Jul. 22, 1996.

"IEEE Standard for a High Performance Serial Bus-Amendment 1", Institute of Electrical and Electronics Engineers, Inc., pp. 1-196, approved Mar. 30, 2000.

P1394b IEEE Draft Standard for a High Performance Serial Bus (High Speed Supplement) P1394b Draft 1.3.3., Institute of Electrical and Electronics Engineers, Inc., pp. 1-408, Nov. 16, 2001.

"AV/C Digital Interface Command Set General Specification, Rev. 3.0", 1394 Trade Association, pp. 4-5, 20-34, Apr. 15, 1998.

"Enhancements to the AV/C General Specification 3.0 Version 1.0FC1", 1394 Trade Association, pp. 4, 6-17, Nov. 5, 1998.

"Fibre Channel-Methodologies for Jitter Specification", NCITS TR-25-1999, Jitter Working Group Technical Report, Rev. 10, pp. 1-96, Jun. 9, 1999.

* cited by examiner

METHOD, APPARATUS AND COMPUTER PROGRAM PRODUCT FOR ENSURING NODE PARTICIPATION IN A NETWORK BUS

FIELD OF THE INVENTION

The present invention relates broadly to computer networks. More specifically, the present invention relates to configuring computer networks so that a root node is always assigned a valid identification value during a self-identification process.

BACKGROUND OF THE INVENTION

Directing attention to FIG. 1, the IEEE 1394a standard defines communication protocols between nodes 10 on a computer network 12. Nodes 10 can be personal computers, workstations, or other computing devices. Each node has a PHY 14, which facilitates communication between the nodes and other nodes in network 12. PHY 14 has a plurality of ports so that multiple connections can be made to node 10. Nodes 10 can be connected by cable 16, or other suitable communication medium, to implement computer network 12. It is one of the goals of the 1394a standard to implement a protocol that treats all communication media connecting nodes 10 collectively as bus 16. To achieve this objective, two processes are executed on each of the nodes: a tree_ID process and a self_ID process.

The tree_ID process is executed in a distributed manner among the nodes to configure a tree structure among nodes 10. The tree_ID process executed on each node establishes a hierarchy among nodes 10 such that each connection between two nodes 10 defines one node as the parent of the other node and the other node as the child of the first node. A node 10 may thus be parent to zero or more children, and each node 10 has at most one parent. On each node 10, a flag on each port in PHY 14 indicates the peer node as either a parent or a child. A root node 10-1 eventually is determined to be a node that has only children and no parent. By establishing a hierarchy among nodes 10, the communication protocols of the 1394a standard are able to function properly. The root node has particular responsibilities, such as acting as cycle master and issuing cycle start packets. This function is essential to isochronous operation, which, in turn, is essential to the use of the 1394 standard in consumer digital audio-visual applications among others. When a node has identified all connections to its PHY 14 as being connections to children with the exception of one connection, it is assumed that the remaining, unidentified connection points to a potential parent node.

Once all of nodes 10 have completed the tree_ID process, and every node has set its flags on all its ports to either parent or child, the network configuration state moves to the self_ID process. The self_ID process takes place in a distributed manner. The 1394a standard specifies that each child node must wait for a signal from its parent node before beginning its contribution to the self_ID process, and that the root node 10-1 initiates the process. As defined in the 1394a standard, six bits are provided on each node to designate a unique identifier within network 12. A maximum value, 63, is reserved as a broadcast identifier for all nodes in network 12. Thus, if a node needs to send a message to all nodes 10, it sets the address message for node 63 and all nodes in network 12 receive this message. Node value 63 is not individually addressable. A node having a value of 63 indicates a malconfigured bus. Any such node may repeat packets originated by other nodes, but is not permitted otherwise to participate in bus activity. The remaining identifiers, 0 through 62, are available for identification designation.

During the self_ID process, each node 10 in turn assigns itself a unique identifier, so that the process assigns a unique identifier to nodes 10 on network 12. Each node 10 maintains a register that records the next available identifier. When a node 10 receives a notification that another node 10 has assigned itself an identifier, the node 10 updates its register to the next value incrementally. However, the value in the register is not allowed to exceed 63. When a child node is instructed by its parent node to execute its contribution to the self_ID process, the child first instructs its children (if any) in turn to execute their contributions to the self_ID process. When all its children have completed their contributions, the node checks its internal register for the next available value and selects this value as its identifier. It then broadcasts this value across network 12 and all nodes update their identification registers with this node-value assignment. The child node then instructs the parent node that it has completed the self_ID process. Once all of the children of a parent node have assigned values to themselves, the parent node selects a value in a similar fashion, and sends a message to its parent that it has finished. This process continues up the tree until root node makes the final node-value assignment. The root thus always assigns itself the highest node-value. This self_ID process as executed in a tree structure is illustrated in FIG. 2.

The self_ID process works smoothly as long as there are 62 or less nodes connected in network 10. In these cases, the root will have a node value of 62 or less. If more than 63 nodes are present on the bus, then the nodes after the $63^{rd}$ to allocate themselves identifiers, including the root node, are all allocated Physical_ID 63. FIG. 3 illustrates a network where more than 63 nodes are connected and an attempt to execute self_ID has failed. As shown, node 20 is a non-root node that has selected the value of 62 for itself, thus denying the root node the opportunity to allocate itself a value of 62 or less. Because the 1394a standard defines special functions for the root node, the network illustrated in FIG. 3 has failed to properly execute the self_ID process and communication cannot proceed properly. There is a need for a solution to this problem that allows a network to be configured in a fault tolerant manner that accommodates the 1394a standard and thus realizes its benefits.

SUMMARY OF THE INVENTION

The present invention provides a solution to the problem described above that modifies the self_ID process of the 1394a standard to mark nodes in excess of the allowable value as non-functional nodes and thus preserve the node configuration mandated by the 1394a standard. The present invention ensures that, during self_ID processes, no non-root node can allocate itself Physical_ID 62. Said differently, Physical_ID 62 is reserved for use only by root. Consequently, a node which is root can be fully functional, despite a malconfigured bus, and in particular can exercise its specific bus-related responsibilities. For each node that executes the self_ID process, a check is made of the available Physical_ID value as well as the designation of the node as a root or non-root node. If the value available is less than 62, the value is assigned to the node. If the value not less than the root node, a check is made to see if the node is a root node. If the node is a root node, the value 62 is assigned to the node. If the node is not a root node, the value 63 is assigned to the node. After a value is assigned to a node, that value-node assignment is broadcast over the network and the registers showing the next available value are updated. Control loops through this algorithm until all nodes have been assigned a value.

In another aspect of the invention, a method for ensuring proper Physical_ID assignment to a root node in a network is disclosed. In one embodiment, the method comprises: selecting a physical identification value to be assigned to a node, the physical identification value uniquely identifying the node within a network; comparing the selected physical identification value to a value reserved for a root node; assigning the selected physical identification value to a node if the selected physical identification value is less than the value reserved for the root node. If the selected physical identification value is not less than the value reserved for the root node and if the node is root node then assigning the value reserved for the root node to the root node; and if the selected physical identification value is not less than the value reserved for the root node and if the node is not root node then assigning to the node a physical identification value greater than the value reserved for root node.

In yet another aspect of the invention, a computer readable medium comprising instructions is disclosed. In one embodiment, the instructions, when executed by a computer: select a physical identification value to be assigned to a node, the physical identification value uniquely identifying the node within a network; compare the selected physical identification value to a value reserved for a root node; and assign the selected physical identification value to a node if the selected physical identification value is less than the value reserved for the root node. If the selected physical identification value is not less than the value reserved for the root node and if the node is root node then assign the value reserved for the root node to the root node. If the selected physical identification value is not less than the value reserved for the root node and if the node is not root node then assign to the node a physical identification value greater than the value reserved for root node.

In still another aspect of the invention, a method for assigning an identifier to each node of a network is disclosed. In one embodiment, the network comprises a serial bus network, and the method comprises: executing a first process until the value of a current identifier is greater than or equal to the value of an identifier reserved for the root node, the first process comprising: selecting a node that has not yet been assigned an identifier; assigning the current identifier to the node; and selecting the next available current identifier as the current identifier; and executing a second process until the root node is selected, the second process comprising: selecting a node that has not yet been assigned an identifier; and assigning a special identifier to the node. A third process comprising assigning the identifier reserved for the root node to the root node is also executed.

In a further aspect of the invention, a system for assigning an identifier to each node of a network is disclosed. In one embodiment, the network comprises a serial bus network, and the system comprises: a first module adapted to execute a first process until the value of a current identifier is equal to the value of an identifier reserved for the root node, the first process comprising: selecting a node that has not yet been assigned an identifier; assigning the current identifier to the node; and selecting the next available current identifier as the current identifier; a second module adapted to execute a second process until the root node is selected, the second process comprising: selecting a node that has not yet been assigned an identifier; and assigning a special identifier to the node; and a third module adapted to assign the identifier reserved for the root node to the root node.

In still another aspect of the invention, a method for assigning an identifier to nodes of a network is disclosed. In one embodiment, the method comprises: successively assigning a current identifier to a respective node of the network until the value of the current identifier bears a prescribed relationship to a reserved identifier; successively assigning a special identifier to respective ones of nodes without identifiers; and assigning the reserved identifier to a designated node.

In yet a further aspect, a method for ensuring the proper assignment of unique node identifiers within a network is disclosed. In one embodiment, the method comprises: selecting an identification value and assigning that selected value to a given node in the network if the selected value is less than a predetermined value associated with a designated node; and if the selected identification value is not less than the predetermined value, and if the given node is the designated node, then assigning the predetermined value to the designated node.

DETAILED DESCRIPTION

Figure 1:
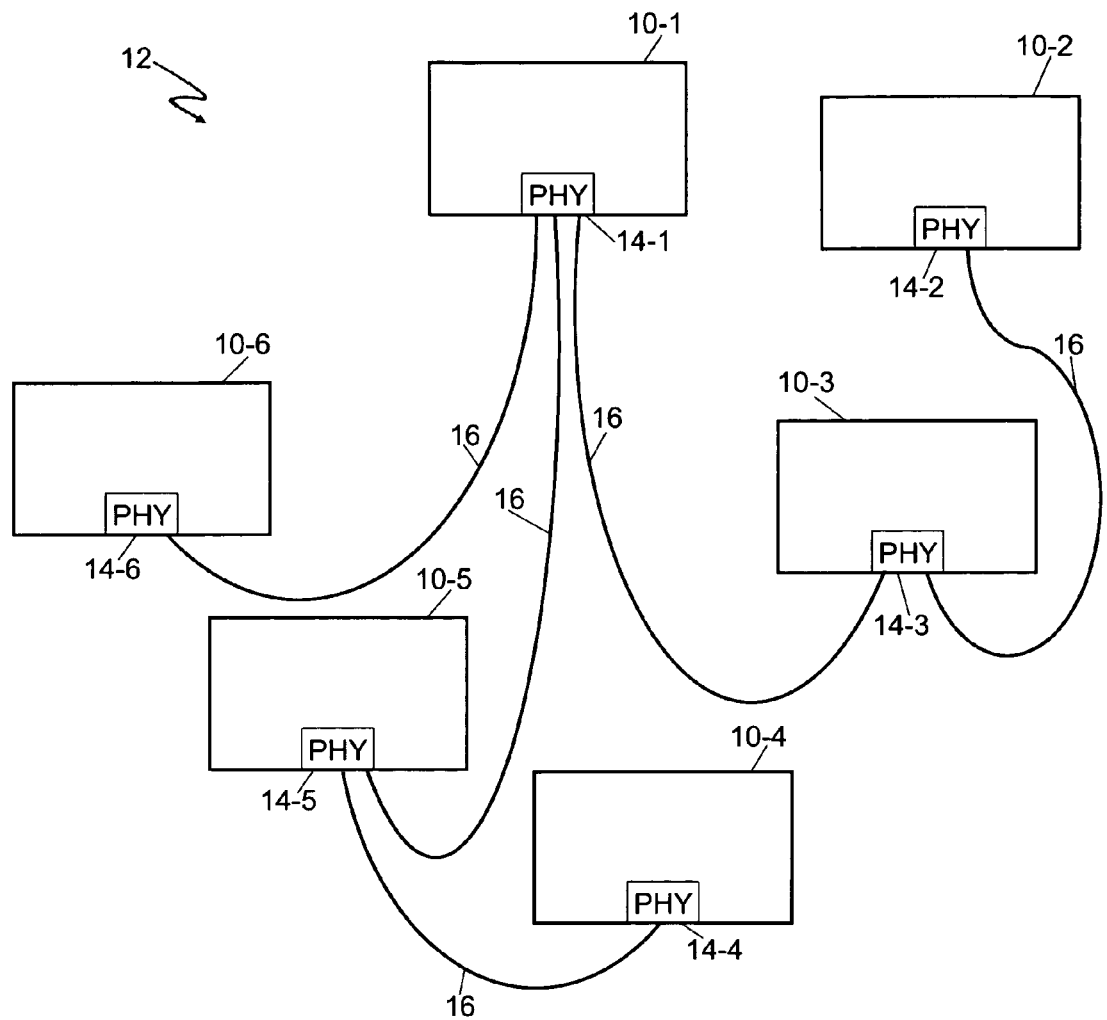
FIG. 1 is a schematic in block diagram form of a network of nodes in accordance with the IEEE 1394a standard.
Figure 2:
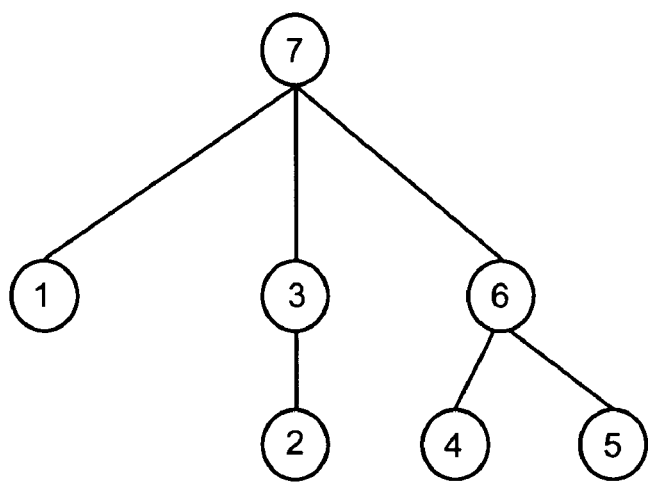
FIG. 2 is a schematic illustrating node-value assignment in a proper execution of the self-identification process in accordance with the IEEE 1394a standard.
Figure 3:
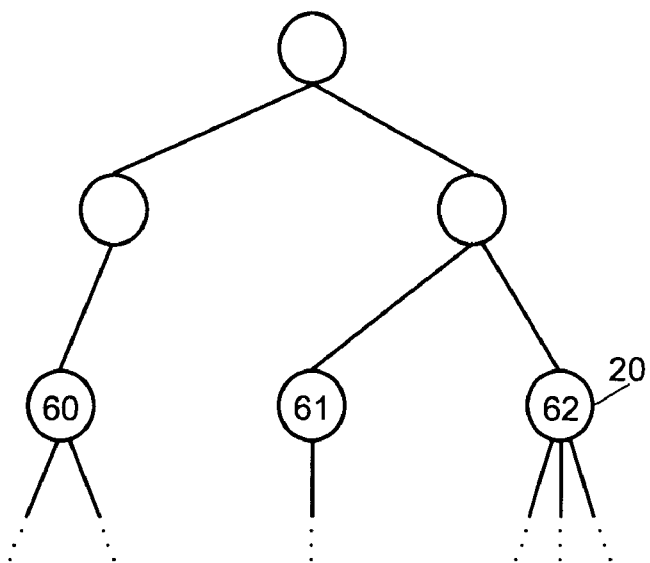
FIG. 3 is a schematic illustrating an anomaly that may occur under the existing self-identification process of the IEEE 1394a standard.
Figure 4:
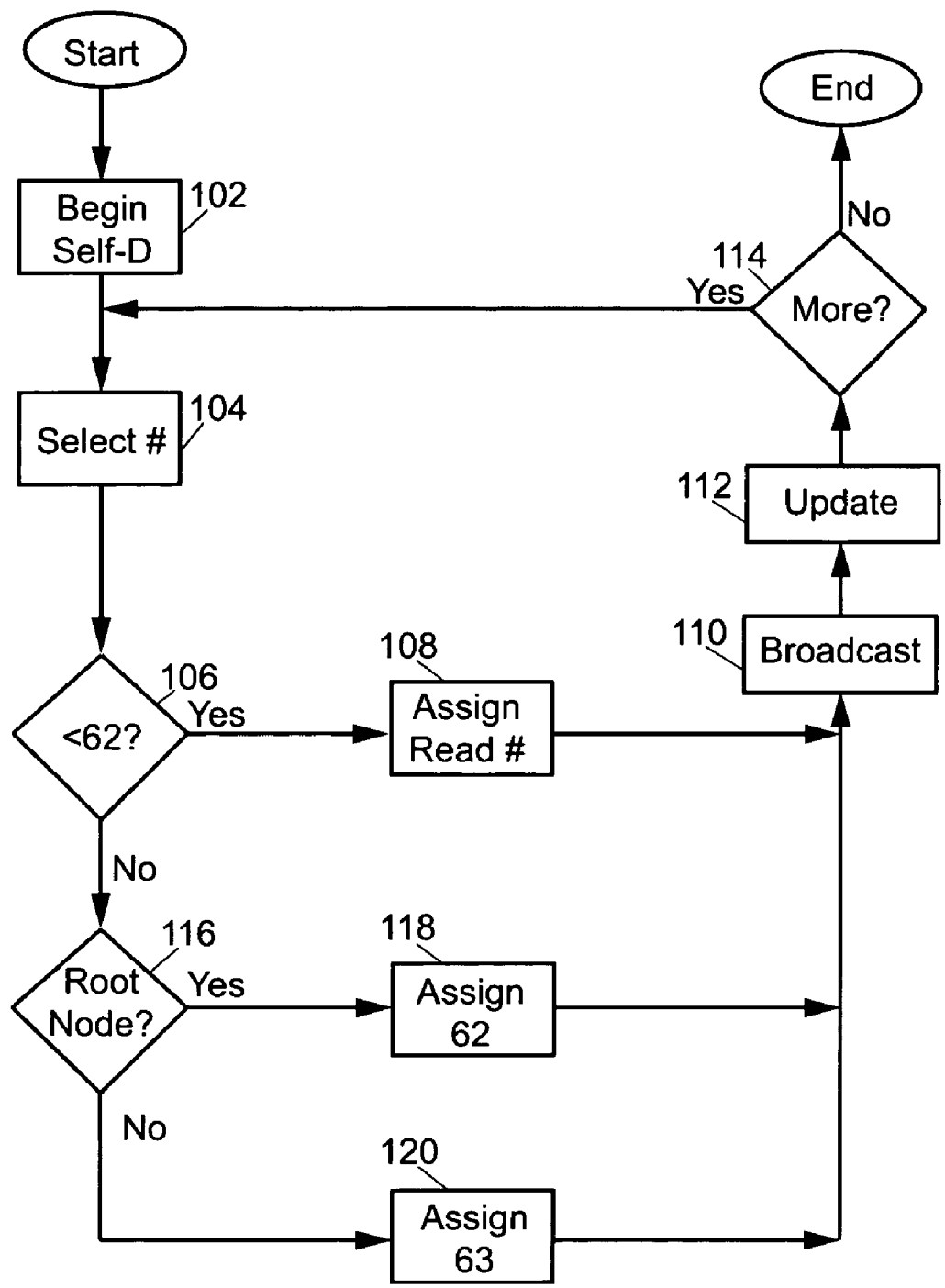
FIG. 4 is a schematic in flow chart form illustrating the logical sequence of operations as performed by the present invention.

Directing attention to FIG. 4, the method of the present invention is illustrated in algorithm 100. In the preferred embodiment, algorithm 100 is stored as computer readable instructions within memory or storage on each node 10 and executed in concert with the self_ID process described in the IEEE 1394a standard. Algorithm 100 parses the self_ID packet to extract the PHY ID of packets which are being received. In self_ID receive actions, if the count of self_ID sequences reaches or exceeds 62, the node records whether any self_ID sequence has already used 62, which may happen if legacy PHYs are present. If not, the node takes the value 63 as its Physical_ID, unless it is the root node, in which case it takes 62 as its Physical_ID. The self_ID process begins at step 102, as described above. At step 104, a node selects a value from a six bit register stored on the node that is incremented as values are assigned as Physical_IDs for individual nodes in a network. The selected value is then compared at step 106 to the value, 62. If the selected value is less than 62, the selected value is assigned as the node's Physical_ID at step 108. The node-value assignment is then broadcast throughout network 12 at step 110, and the nodes 10 perform updates to reflect the assignment as well as increment the value available for node identification assignment. At step 114, a check is made to determine whether additional nodes need to perform the self_ID process. If yes, control returns to step 104; otherwise the method is completed. Returning to step 106, if the selected value is not less than 62, control proceeds to step 116. At step 116, a comparison is made to determine whether the node that has selected the value is the root node. This determination is made by checking the flag bits on the node that indicate whether the node is a parent or a child. If the node shows that it has only children and no parent node, it is considered to be the root node. Control proceeds to step 118, where the value 62 is assigned as the node's Physical_ID. Control then proceeds through steps 110-114 as described above. Returning to step 116, if the node is not the root node, control proceeds to step 120, where the value 63 is assigned as the node's Physical_ID. Control then proceeds through steps 110-114 as described above.

While the value of 62 is reserved for root node and nodes that exceed the maximum number of nodes allowed in the network are assigned the value of 63, these values can be adjusted as needed, depending on how many nodes can be accommodated on network 10.

Figure 5:
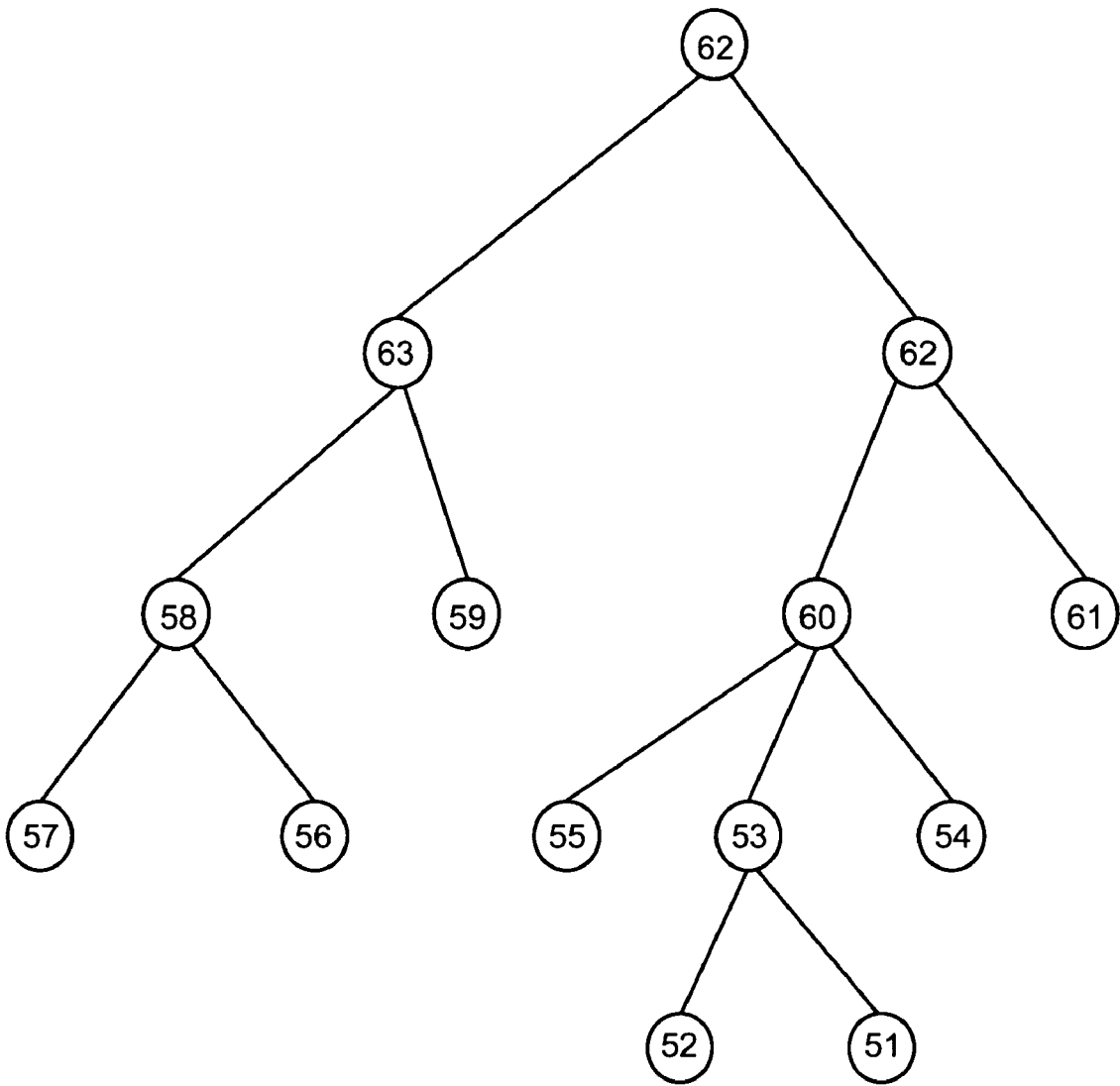
FIG. 5 is a schematic illustrating the resulting node-value assignment generated by the logical sequence of operations shown in FIG. 4.

The product of algorithm 100 is the node-value assignment illustrated in FIG. 5. As shown in FIG. 5, the root node is assigned the value 62 while its immediate children both have the value 63. With this configuration, network 10 can function properly as the root node is correctly designated, and all nodes in excess of the value accommodated in the 1394a standard are identified as 63. Thus, the additional nodes exceeding the allowable value are effectively neutralized while still remaining in communication with the rest of network 12, and in particular participating in bus arbitration and in repeating packets across the network 12.

Figure 6:
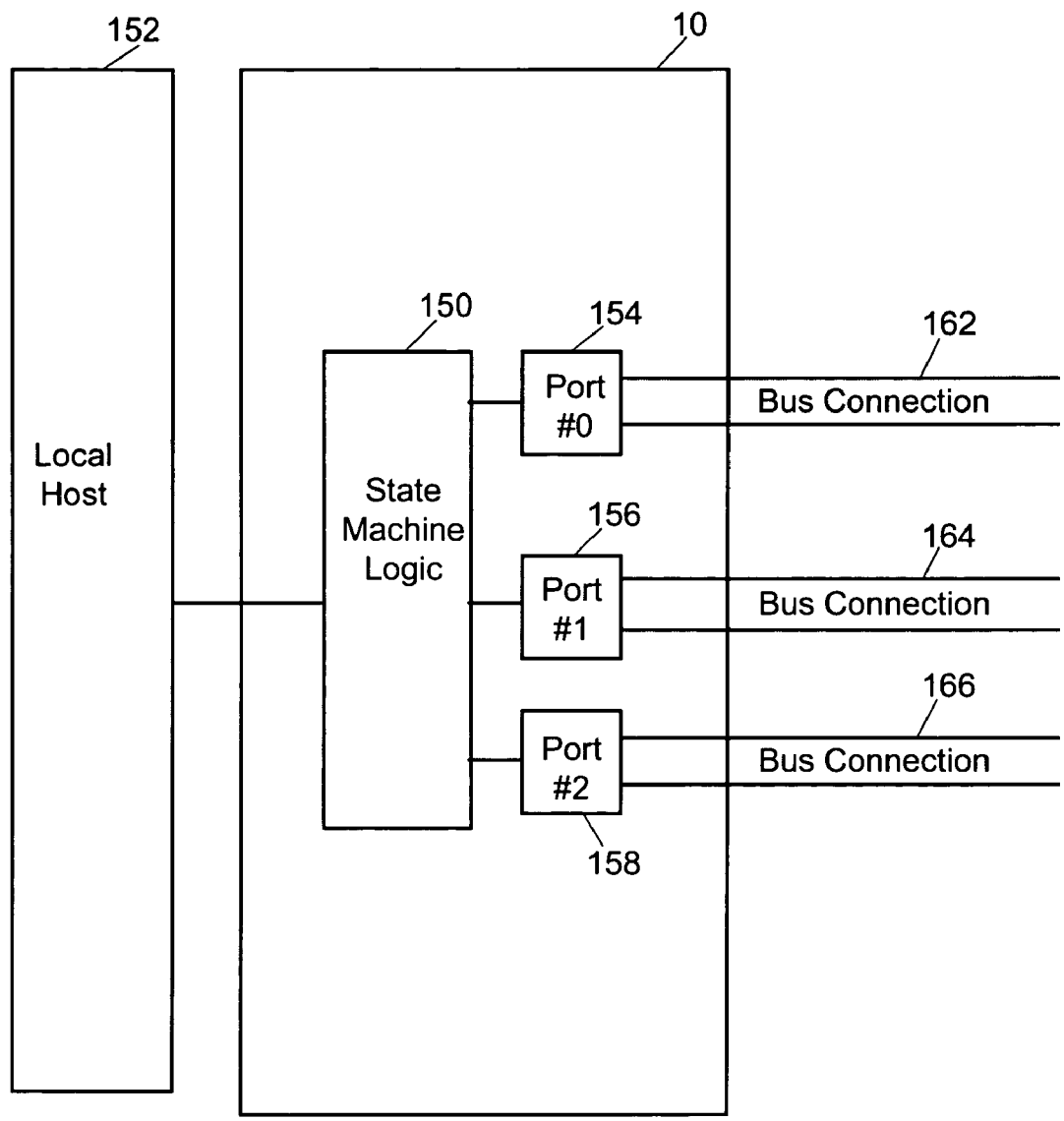
FIG. 6 is a schematic in block diagram form illustrating the major components in a node in a network according to the present invention.

Referring now to FIG. 6, a block diagram of a node 10 is illustrated. In a preferred embodiment, the nodes are designed to be compatible with the IEEE1394a Serial Bus Standard. The node 10 includes state machine logic 150. This state machine logic 150 incorporates all the logic circuitry for carrying out the methodologies and algorithms to be described herein. The circuitry may comprise a programmable logical array (PLA) or be uniquely designed to carry out the functions described herein. Those of ordinary skill in the art, having the benefit of this disclosure, will be able to implement the present invention without undue experimentation. The node 10 is coupled to a local host 152.

The local host 152 may be any device one wishes to attach to the bus, such as a disk drive, CPU, keyboard, television, stereo, household appliance, or any other component which needs to communicate with other components in the system. The node 10, by means of its logic, will implement the arbitration protocol including the bus initialization, tree identification and self-identification described above.

The node 10 communicates with other nodes through communications links. A link is a connection between two ports. Typically, a cable segment is used for a link. However, a link may be implemented as any physical communication channel, including wireless RF or infrared. A port is the interface between a node and a link. A port has the ability to transmit and receive data. A port can also determine whether it is connected to another port through a link. As shown In FIG. 6, node 10 includes ports 154, 156, 158, with connecting links 160, 162, and 164, respectively.

An individual node may have more than one port, and each node is able to transmit and receive data on any one of its ports. A node is also able to receive and transmit signaling messages through all of its ports.

While the preferred embodiment of the present invention has been illustrated and described in detail, it is to be understood that the figures and detailed description are merely illustrative and many modifications can be made without departing from the spirit of the invention.

What is claimed is:

1. A method for ensuring proper Physical_ID assignment to a root node in a network, comprising:
   selecting a physical identification value to be assigned to a node, the physical identification value uniquely identifying the node within a network;
   comparing the selected physical identification value to a value reserved for a root node;
   assigning the selected physical identification value to a node if the selected physical identification value is less than the value reserved for the root node;
   if the selected physical identification value is not less than the value reserved for the root node and if the node is root node then assigning the value reserved for the root node to the root node; and
   if the selected physical identification value is not less than the value reserved for the root node and if the node is not root node then assigning to the node a physical identification value greater than the value reserved for root node.

2. The method of claim 1, further comprising broadcasting the assigned physical identification value to other nodes in the network.

3. The method of claim 1, further comprising updating a register of available values for assignment as physical identification values.

4. The method of claim 1, wherein identification values are selected in accordance with a IEEE 1394a standard.

5. A computer readable medium comprising instructions, which, when executed by a computer:
   select a physical identification value to be assigned to a node, the physical identification value uniquely identifying the node within a network;
   compare the selected physical identification value to a value reserved for a root node;
   assign the selected physical identification value to a node if the selected physical identification value is less than the value reserved for the root node;
   if the selected physical identification value is not less than the value reserved for the root node and if the node is root node then assign the value reserved for the root node to the root node; and
   if the selected physical identification value is not less than the value reserved for the root node and if the node is not root node then assign to the node a physical identification value greater than the value reserved for root node.

6. A method for assigning an identifier to each node of a serial bus network, said method comprising:
   executing a first process until the value of a current identifier is greater than or equal to the value of an identifier reserved for the root node, said first process comprising:
      selecting a node that has not yet been assigned an identifier;
      assigning the current identifier to said node; and
      selecting the next available current identifier as the current identifier;
   executing a second process until the root node is selected, said second process comprising:
      selecting a node that has not yet been assigned an identifier; and
      assigning a special identifier to said node; and
   executing a third process comprising assigning the identifier reserved for the root node to the root node.

7. The method of claim 6, wherein the serial bus network comprises an IEEE-1394 compliant serial bus network.

8. The method of claim 7, wherein the special identifier comprises a binary stream equivalent to the decimal number 63.

9. The method of claim 7, wherein the identifier reserved for the root node comprises a binary stream equivalent to the decimal number 62.

10. The method of claim 6, wherein said selecting the next available current identifier comprises selecting an identifier with a value greater than the value of the current identifier.

11. The method of claim 6, wherein said selecting the next available current identifier comprises selecting an identifier with a value greater than the value of the current identifier but less than the value of all other unassigned identifiers.

12. The method of claim 6, wherein said selecting the next available current identifier comprises selecting an identifier with a value that is one greater than the value of the current identifier.

13. The method of claim 6, wherein said selecting a node that has not yet been assigned an identifier is accomplished by a depth-first procedure.

14. The method of claim 6, wherein said selecting the next available current identifier as the current identifier comprises updating one or more registers.

15. A system for assigning an identifier to each node of a serial bus network, said system comprising:
- a first module adapted to execute a first process until the value of a current identifier is equal to the value of an identifier reserved for the root node, said first process comprising:
  - selecting a node that has not yet been assigned an identifier;
  - assigning the current identifier to said node; and
  - selecting the next available current identifier as the current identifier;
- a second module adapted to execute a second process until the root node is selected, said second process comprising:
  - selecting a node that has not yet been assigned an identifier; and
  - assigning a special identifier to said node; and
- a third module adapted to assign the identifier reserved for the root node to the root node.

16. The system of claim 15, wherein the serial bus network comprises an IEEE-1394 compliant serial bus network.

17. The system of claim 16, wherein the special identifier comprises a binary stream equivalent to the decimal number 63.

18. The system of claim 16, wherein the identifier reserved for the root node comprises a binary stream equivalent to the decimal number 62.

19. The system of claim 15, wherein said selecting the next available current identifier comprises selecting an identifier with a value greater than the value of the current identifier.

20. The system of claim 15, wherein said selecting the next available current identifier comprises selecting an identifier with a value greater than the value of the current identifier but less than the value of all other unassigned identifiers.

21. The system of claim 15, wherein said selecting the next available current identifier comprises incrementing the current identifier.

22. The system of claim 15, wherein said selecting a node that has not yet been assigned an identifier is accomplished by a depth-first procedure.

23. The system of claim 15, wherein selecting the next available current identifier as the current identifier comprises updating one or more registers.

24. A method for assigning an identifier to nodes of a network, said method comprising:
- successively assigning a current identifier to a respective node of said network until the value of the current identifier bears a prescribed relationship to a reserved identifier;
- successively assigning a special identifier to respective ones of nodes without identifiers; and
- assigning the reserved identifier to a designated node.

25. The method of claim 24, wherein said prescribed relationship comprises said current identifier having a value greater than or equal to the value of an identifier reserved for said designated node.

26. The method of claim 25, wherein said designated node comprises a root node of said network.

27. The method of claim 24, wherein said successively assigning a special identifier comprises assigning special identifiers to nodes without identifiers until the designated node is selected.

28. A method for ensuring the proper assignment of unique node identifiers within a network, comprising:
- selecting an identification value and assigning that selected value to a given node in the network if the selected value is less than a predetermined value associated with a designated node; and
- if the selected identification value is not less than the predetermined value, and if the given node is the designated node, then assigning the predetermined value to the designated node.

29. The method of claim 28, further comprising assigning to the given node an identification value greater than the predetermined value only if: (i) said selected identification value is not less than the predetermined value, and (ii) the given node is not the designated node.

* * * * *